Sept. 20, 1960

J. BEER 2,952,932

PERPETUAL CALENDAR

Filed Feb. 10, 1958

2 Sheets-Sheet 1

INVENTOR.
JACK BEER
BY Theodore Hafner
ATTORNEY

Sept. 20, 1960 J. BEER 2,952,932

PERPETUAL CALENDAR

Filed Feb. 10, 1958

2 Sheets-Sheet 2

INVENTOR.
JACK BEER
BY Theodore Hafner
ATTORNEY

United States Patent Office 2,952,932

Patented Sept. 20, 1960

2,952,932

PERPETUAL CALENDAR

Jack Beer, 63—33 108th St., Forest Hills, N.Y.

Filed Feb. 10, 1958, Ser. No. 714,238

5 Claims. (Cl. 40—113)

This invention relates to perpetual calendars and more specifically to perpetual calendars of the type showing the days for every desired month within a predetermined rather large number of years.

It is one of the objects of the inventor to distribute the specific query data (year and month in question) over several record carriers or sheets, one of which shows, in addition to such query data, part of the answer data while other answer and query data together with certain general or key data are recorded on a second record sheet, the final answer data being obtained by correlating or superimposing the various query and key elements distributed over the different sheets and deriving from such correlation or superimposition the missing answer data.

Another object of the invention is to provide on one movable data carrier several rows of data in circumferential as well as radial and angularly intersecting positions and further to provide on another data carrier which is held stationary at least some query elements which when correlated to certain other query elements on the stationary carrier result in predetermined relative positions between first and second carriers thereby permitting derivation from both of such carrier derivative or intermediate key data and eventually from such intermediate data final answer data to be interpreted in combination with other query data arranged on the stationary carrier.

It is a specific object of the invention to provide on the stationary carrier preferably a carrier sheet, windows permitting correlation, superimposition or juxtaposition of the various query, key and answer elements of the two carriers.

Still another object of the inevntion is to provide two stationary carrier sheets or record-carrying means, one sheet containing part of the query elements such as year and month in question, an intermediate movable carrier sheet containing on both sides thereof another part of the query elements, key elements and part of the answer elements, and a back sheet containing another part of the answer elements such as all the days of the month concerned divided in one section showing the first 28 days and in another section showing the next following days of that month, including leap year days.

A more specific object of the invention is to provide on a back carrier sheet, several circumferential top rows cooperating through a window in a front sheet with a year element arranged on the top sheet and permitting correlating with the year queried one or more key elements; another circumferential row on the back sheet through a second window in the first sheet permits under control of a year key to correlate that year with a number of month representative keys, said latter keys being arranged in radially extending rows. A circumferential inner row shows through a third window of the first sheet day designations correlated with a 28 day month display; such correlations being effected through a fourth window under control of the month key; said latter keys being arranged on a second inner circumferential row. The top sheet finally provides a fifth window correlated with angularly intersecting rows of the second sheet and showing in the last-mentioned position of the month key the days of the month in question following the 28th day, including the 29th day of a leap year February.

Perpetual calendars with one face only have already been proposed, but because of the differences in the number of days of the months of a year, and also in view of the differences between ordinary and leap years, such calendars have not been successful. They required manual corrections or additional mental operations, and had to be readjusted every month and also every four years; and even so the correct amount of days for the month was incorrect as the resulting indication was for thirty-one days. In contrast thereto it is one of the objects of the invention, to provide for a practically automatic adjustment of the leap years, with the use of special windows or cut-outs in the face of the month indications; and it is a further object of the invention to provide a calendar device wherein the user by following certain directions, without any mental effort, will obtain on the face of the calendar, the correct amount of days for any month desired, within a predetermined number of years extending over the past, present and future; the result and especially the leap year result, will be derived from a window or opening on the bottom of the face of the month indications. Such bottom position will show a blank on the February of non-leap years, and the figure "29" on the February of leap years; and otherwise and automatically, the figures "30" and "31" for the remaining months of the year in question.

Another specific object of the invention is to provide on an intermediate or selecting means sheet arranged movable between stationary top and bottom sheets circumferential top rows associating each year of a number of years in one row with a key symbol contained in another row, and permitting correlation through a window in the top sheet, of a number of radial key symbols with a number of circumferential key symbols and permitting through a longitudinal window in the top sheet to correlate the key symbol of the first window with a key symbol in the second window for each month, and finally an inner circumferential row of key symbols which under control of the second key symbol permits adjustment of the intermediate sheet to a final position; the other side of said inner sheet showing in one circumferential row the days of the week for the first 28 days, and in a number of angularly intersecting inner rows the days of the month in question extending beyond the 28th day; the third sheet which is stationary has a circumferential window showing the day designations of the first 28 days of the month and another window showing the day designation beyond the 28th day for that same month, including leap year days.

These and other objects of the invention will be more fully described in connection with the drawings enclosed herewith in which Fig. 1 shows in top view a two-sheet combination of a perpetual calendar embodying certain features of the invention.

Fig. 7 represents a cross section through the entire three-sheet combination, while

Figure 1:
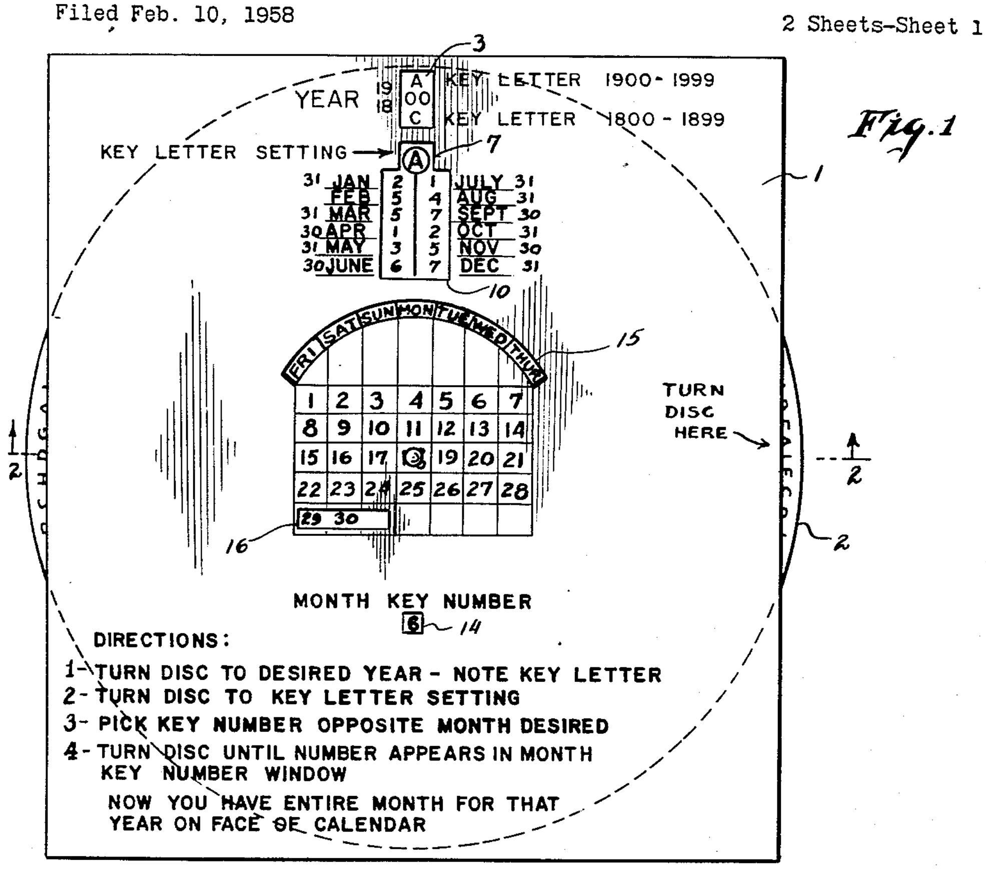
Figure 2:
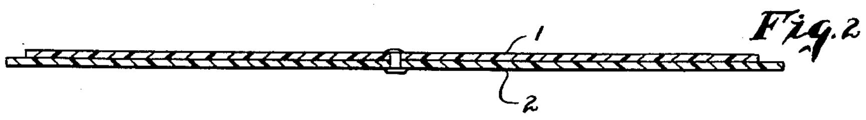
Fig. 2 shows a cross section therethrough.

In Figs. 1–4, a perpetual calendar of the type permitting evaluation of any day of a 200 year period from 1800 to 1999 is shown.

This calendar consists of two sheets, a square top sheet or record-carrying means 1 which is considered stationary, and a bottom sheet or round disc 2 as a selecting means which is arranged movable or rotatable around axis A with respect to top sheet 1.

Top sheet 1 contains certain elements of the query data cooperating with corresponding elements of bottom sheet 2.

Thus, for example, top window 3 permits to correlate an element of the two circumferential key rows 4, 5 of bottom sheet 2 with any of the years of 1900–1999 and 1800–1899, respectively, appearing on intermediate circumferential row 6 of bottom sheet 2.

After such correlation has been effected, there will appear in the second window 7 of top sheet 1 under control of a key symbol derived from row 3 or 4, respectively, also appearing in circumferential row 8 of bottom sheet 2, after adjustment of bottom sheet 2, a series of key symbols 9 correlated to the different months of the year in question. As apparent from Fig. 3, the month key symbols or numbers are arranged in a number of pairs of radial rows indicated in Fig. 3 at 9 and appearing in window 10 of sheet 1 which in the present case forms a part or extension of window 7.

Figures 3, 4:
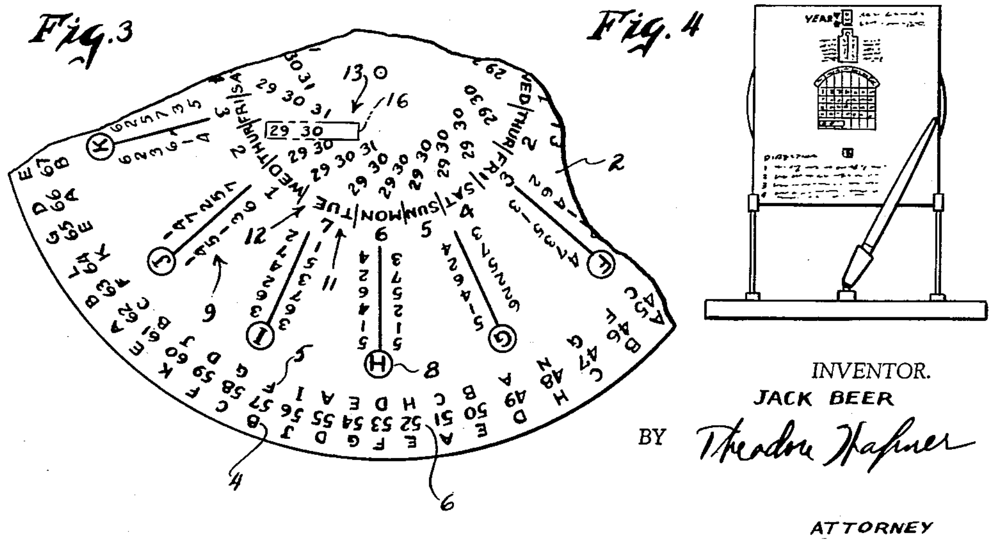
Fig. 3 shows the bottom sheet of Fig. 1 or at least part thereof and Fig. 4 shows a practical arrangement of such two-sheet combination.

After having derived from window 10 the key symbol for the desired month, this month key number is correlated to a group of day names appearing on sheet 2, by means of circumferential rows indicated in Fig. 3 at 11 and 12, respectively, and also correlated to a series of intersecting rows showing a number of combinations of days of the month exceeding the first 28 days and arranged in a number of rows inside circular row 12 and intersecting the radius of sheet 2 as schematically indicated at 13.

Circumferential rows 11 and 12 as well as intersecting row 13 cooperate with the key window 14 in sheet 1 showing the key symbol derived from opening 10, and furthermore, with a circumferential window 15 in sheet 1 showing the day designations for such key number, and finally, the excess days 13 are arranged to appear in a horizontal window 16 of sheet 1 in a position to indicate the proper relation between the corresponding excess days and the day designations appearing in circumferential window 15.

At the same time, on sheet 1, window 15 is associated with four horizontal rows indicating the numerical sequence of the first 28 days of the month associated with the month key symbol in question.

As apparent from Fig. 4, the calendar structure 1, 2 may be arranged in a fixed structure on a desk, and all that is necessary for its operation is to follow the instructions indicated on the front of sheet 1.

The invention, however, is not limited to the particular arrangement of query elements, key data and answer elements and their corresponding windows, respectively.

Figs. 5–9 show another embodiment of the invention permitting the evaluation of particular month data over a 56-year period from 1910 to 1965.

In this embodiment of the invention, the key data and part of the query and answer data are registered on the two sides of an intermediate disc or sheet which is arranged movable, and preferably rotatable, between two relatively stationary sheets carrying another part of the query data and part of the answer data, respectively.

Figure 5:
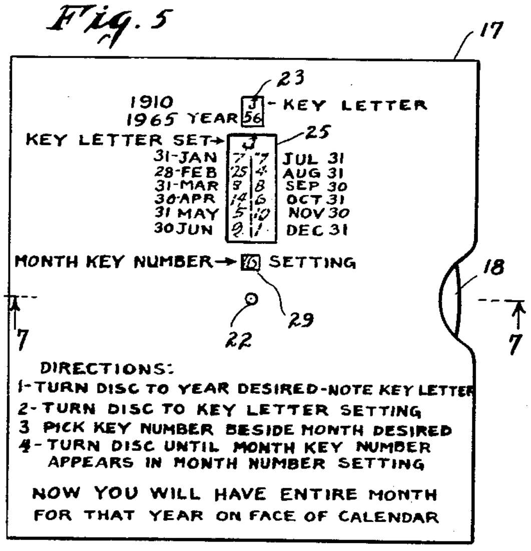
Fig. 5 shows a modification of the embodiment shown in Figs. 1–4 and more specifically a top sheet of a three-sheet combination type of perpetual calendar and Fig. 6 shows the corresponding bottom sheet.
Figure 6:
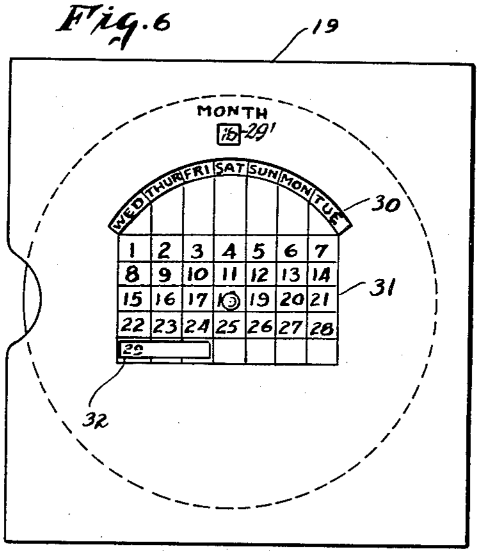
Figure 7:
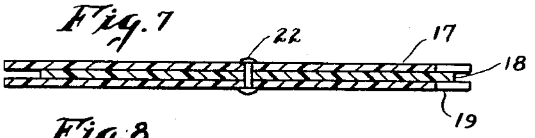
Figure 8:
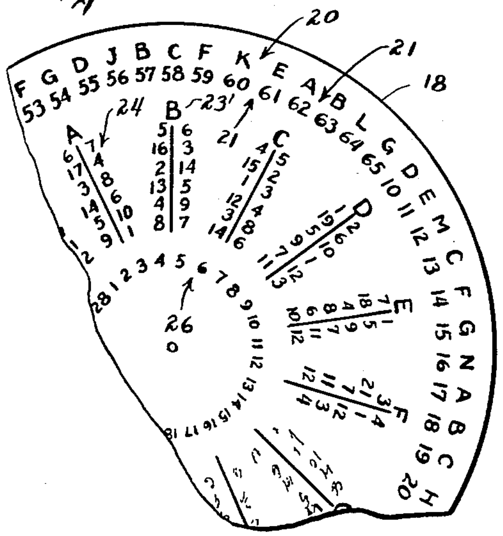
Figs. 8 and 9 represent top and back views, respectively, of an intermediate sheet.
Figure 9:
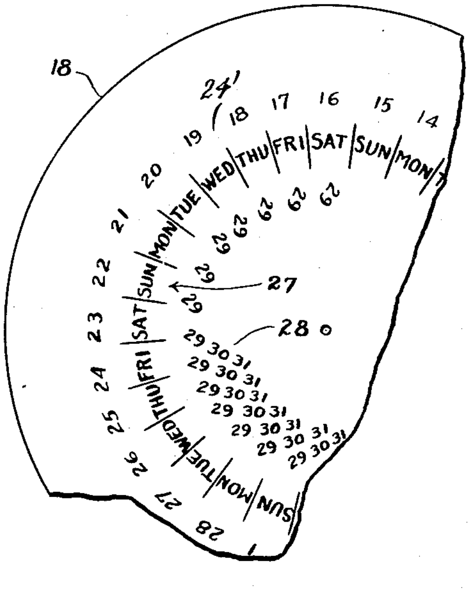

As apparent from Fig. 5, the front of stationary top sheet 17 cooperates with the front of movable intermediate sheet 18 shown in Fig. 8, while the stationary bottom sheet 19, shown in Fig. 6, cooperates with the back of sheet 18 which is shown in Fig. 9.

In a manner similar to that shown in Fig. 3, intermediate sheet or disc 18 has arranged thereon a circular top row 20 of key letters associated with a number of figures representing the year in question which are arranged in another circular row below row 20 as schematically indicated at 21.

By rotating disc 18 around axis 22, a window 23 in top sheet or disc 17 permits a key letter of row 20 to be associated with the year in question.

Each of key symbols 20 is further associated by means of another circular row 23' with a number of radial columns schematically indicated in Fig. 8 at 24 correlating with each key letter 24 a sequence of 12 key symbols correlated with the month in question. This correlation of the key symbols of circular row 24 with radial rows 23 is effected by means of window 25 in top sheet 17.

The resulting month key number, i.e., the number in row 23 corresponding to the month element of the query, is correlated by means of a further circular row 26 arranged on the front side of intermediate disc 18 with another circular row showing the day designations and arranged on the back of disc 18 as schematically indicated in Fig. 9 at 27.

The month key numbers of row 26 are further correlated in predetermined positions with a number of rows consisting of one or three number elements, respectively, and arranged at an angle intersecting with the radius of disc 18 and indicating the days in excess of the first 28 days of the month in question. Such excess day indication is also being obtained under control of the month key number derived from window 25 and reappearing in window 29 or top sheet 17.

The back of bottom sheet 19 then will show in a circular window, indicated at 30 and over table 31, the day designations for the first 28 days of the month in question, and the days in excess of these first 28 days will appear derived from row 28 in horizontal window 32 of back sheet 19 in a position appropriate to show the corresponding day designations on table 31. At the same time, window 29' of Fig. 6 will show the key number of the month as derived from row 24' of Fig. 9 and identical with the key number of window 29 of Fig. 5. The numbers appearing in windows 25, 29, 29' and 32, are drawn in a schematical manner only, because they represent positions of the device not corresponding to that of the number at 23.

Figure 10:
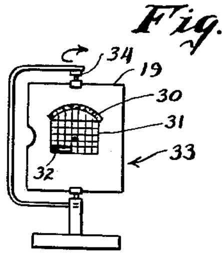
Fig. 10 represents a structural arrangement of a complete calendar unit such as shown in Figs. 5–9.

Fig. 10 shows a particularly simple embodiment of the arrangement of Figs. 5–9 in the form of a disc arrangement rotatable about a vertical axis, schematically indicated at 34, thereby facilitating the selection of the year and month values on the front part of sheet 17 by adjustment of intermediate disc 18; thereafter, by turning the entire assembly over vertical axis 34, the final result may easily be derived from back sheet 19.

Instead of arranging disc structure 33 rotatable about a vertical axis, it could also be arranged rotatable about a horizontal axis provided that opopsite sides of the inner disc, as well as the front and back sides of front and back sheets 17 and 19, are permitted to be read in opposite directions, all this without departing from the scope of this disclosure.

The invention is not limited to the particular arrangements or designations of key symbols, query data, and answer elements, nor to the particular number of years shown and described but may be arranged and applied in any form or manner whatsoever without departing from the scope of this disclosure.

Generally the device is coordinated to reveal the correct relative positions of days in the week for any month and also the correct number of days in the month for any year including leap years. It is not intended to limit the invention to any overall shape or form since its principles are equally applicable to flat or curved, rotary or cylindrical embodiments. The disc type has been used for purposes of illustration. It is understood however that these are limitations of form rather than substance, and any desired shape and form of calendar in which the principles of this invention are applicable, are within the contemplations of the invention, the scope and spirit of which is apprehended in and by the appended claims.

I claim:

1. In a device for determining the names of the days of a particular month of a certain year within a predetermined number of years, record-carrying means carrying at least one group of the year figures corresponding to the predetermined number of years, a number of concentric groups of key symbols, said concentric groups being predeterminedly positioned with respect to the year group to permit associating each year figure with a year key symbol; a portion of said first group of key symbols being arranged to form another of said concentric groups; there being associated with each key symbol of said latter group, a perpendicular group of key symbols corresponding to the month of the year associated with said year key symbols; a portion of said month key symbols forming a further parallel group; an additional concentric group of day name corresponding to the first 28 days of the month, and a number of angular groups representing combinations of days exceeding the first 28 days of a month; both said additional and angular groups being arranged in predetermined positions with respect to said further concentric group of month key symbols; and at least one selecting means movable with respect to said record-carrying means so as to permit associating the year and month in question to year and month key symbols, respectively, and to permit associating the resulting month key symbol with the day names of the first 28 days of the desired month and also with the days exceeding said first 28 days of the month, respectively, including leap year days.

2. Device according to claim 1, wherein said record-carrying means includes a disc and said parallel, perpendicular, and angular groups consist of circumferential, radial, and angular rows of element arranged on said disc, and said selecting means includes a flat sheet, the disc being rotatable with respect to said sheet; and said sheet having openings permitting registration of the elements of said different groups and association of said different groups with each other.

3. Device according to claim 2, wherein all said groups are arranged on one side of said record-carrying disc.

4. Device according to claim 2, wherein said groups are distributed over opposite sides of a single-carrying disc, there being provided two selecting sheets arranged on the front and back of said disc, respectively; said disc being arranged movable with respect to said sheets which are arranged stationary with respect to each other; one sheet having windows permitting association of the year and month in question with corresponding key symbols and the other sheet having windows permitting association of the months key symbols with the day names of the first 28 days of month in question and also with the days exceeding said first 28 days of the month, including leap year days.

5. Device according to claim 4, wherein disc is arranged rotatable between said sheets and said sheets are also arranged rotatable about an axis passing through their common plane and through the axis of rotation of the disc.

References Cited in the file of this patent

UNITED STATES PATENTS

| | | |
|---|---|---|
| 1,253,562 | Appelbaum | Jan. 15, 1918 |
| 1,613,769 | Peterson | Jan. 11, 1927 |
| 2,499,678 | Phillips | Mar. 7, 1950 |
| 2,768,459 | Corbett | Oct. 30, 1956 |